Nov. 7, 1961 A. J. W. M. VAN OVERBEEK ET AL 3,008,091

DIRECT COUPLED CASCADED COMPLEMENTARY TRANSISTOR AMPLIFIER

Filed Sept. 2, 1953

INVENTORS

Adrianus Johannes Wilhelmus Marie van Overbeek
Frederik Hendrik Stieltjes
Pieter Johannes Wilhelmus Jochems
Johannes Ensink
Jan Verhagen
Leonard Johan Tummers BY [signature]

AGENT

United States Patent Office 3,008,091

Patented Nov. 7, 1961

3,008,091

DIRECT COUPLED CASCADED COMPLIMENTARY TRANSISTOR AMPLIFIER

Adrianus Johannes Wilhelmus Marie van Overbeek, Frederik Hendrik Stieltjes, and Pieter Johannes Wilhelmus Jochems, Emmasingel, Eindhoven, and Johannes Ensink and Jan Verhagen, Hilversum, and Leonard Johan Tummers, Emmasingel, Eindhoven, Netherlands, assignors, by mesne assignments, to North American Philips Company, Inc., New York, N.Y., a corporation of Delaware Filed Sept. 2, 1953, Ser. No. 378,122

Claims priority, application Netherlands Nov. 5, 1952

1 Claim. (Cl. 330—17)

This invention relates to transistor amplifiers comprising the cascade of at least a first transistor and a second transistor of opposite conductivity type and, moreover, only one source of energy supply.

It has more particularly for its object to provide a cascade amplifier for broad frequency bands and/or high amplification.

The invention is characterized in that one terminal of the supply source is connected through direct-current connections to the emitter electrode and to the base electrode of the first transistor and to the collector electrode of the second transistor, the collector of the first transistor being connected, through a direct-current connection to one of the two remaining electrodes of the second transistor, and the other of said remaining electrodes of the second transistor being connected by way of a direct-current connection to the other terminal of the supply source with the effect that the supply voltage available per transistor substantially corresponds to the voltage of the supply source.

In the present context the term "of opposite conductivity type" is to be understood to mean that one transistor is, for example, an N-type point-contact transistor or a pnp-junction type transistor, whose emitter electrode has a positive bias and whose collector electrode has a negative bias relatively to the base electrode, whereas the other is a P-type point-contact transistor or a npn-junction type transistor with which the polarity of said biasses is reversed.

It has been proposed to connect two transistors of opposite conductivity type in cascade to one single supply, the two collectors being connected directly together so that a load impedance comnnected in the common circuit of said collectors need not be traversed by direct current. In this event, however, the voltage of the supply is distributed over the two transistors so that only half the supply voltage is available, for each transistor.

In order that the invention may be readily carried into effect, it will now be described in greater detail with reference to the accompanying drawing, in which examples thereof are represented.

With reference to FIG. 1, the collector of the first transistor is connected to the emitter of the second transistor.

In FIG. 2, the collector of the first transistor is connected to the base of the second transistor.

Figures 1, 2, 3:
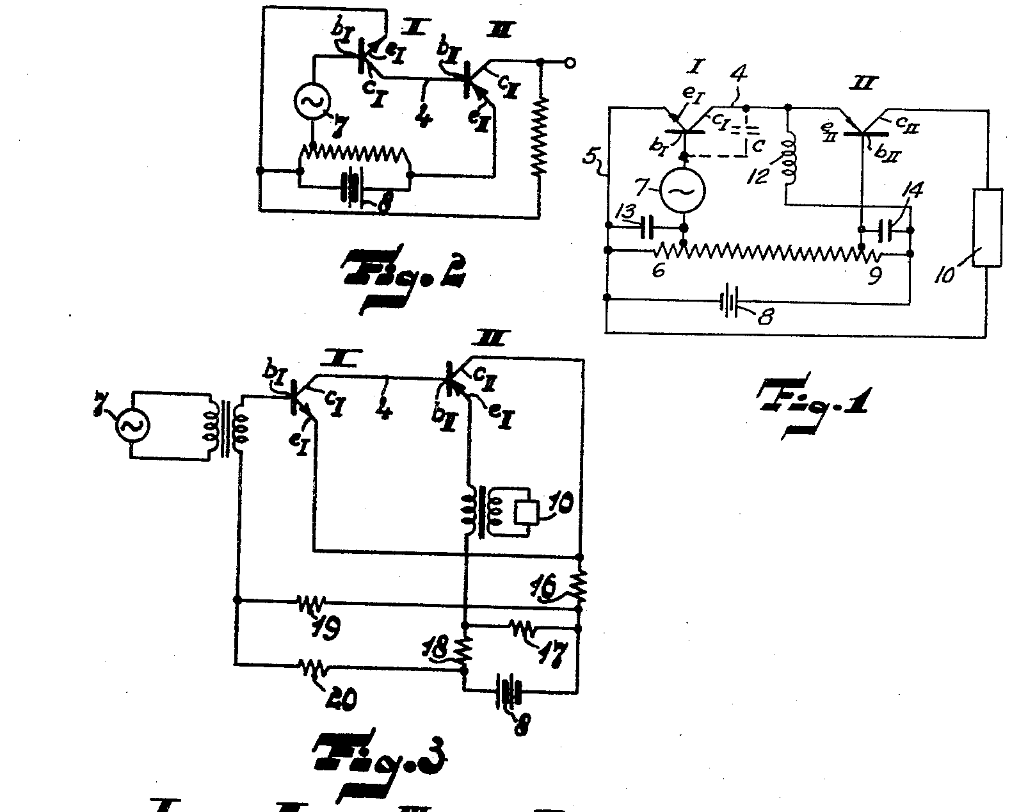
FIG. 3 shows a variant of FIG. 2, in which negative feed-back is employed.

The amplifier shown in FIG. 1 comprises the cascade of two transistors I and II, at least the first transistor I being a junction transistor. A signal to be amplified from a source 7, of which signal the direct current component is sometimes also to be amplified, is supplied to the base $b_I$ of the first transistor I of the cascade, thus producing an amplified signal via the output impedance 10.

According to the invention one terminal of the voltage source 8—in the case shown in the drawing the negative terminal—is connected via a D.C. transmitting circuit 5 to the emitter $e_I$ and through a D.C. transmitting circuit 6 to the base $b_I$ of the first transistor I, it being further connected through a D.C. transmitting circuit, comprising the load impedance 10, to the collector electrode $c_{II}$ of the second transistor II. The collector $c_I$ of the first transistor I is connector via a D.C. transmitting circuit 4 to the emitter $e_{II}$ of the second transistor II, and the base $b_{II}$ of this transistor II is connected via a D.C. transmitting circuit 9 to the other (positive) terminal of the supply 8. The direct current for the circuit 4 is supplied through an impedance 12 having a high value with respect to signal frequencies and, if desired, capacitors 13 and 14 may be provided in order to short-circuit the signal oscillations.

This circuit-arrangement permits the amplification of signals up to high frequencies, since with the aforesaid method of connection the limitation of the frequency range up to which junction type transistors are normally employable does not hold. According to a recognition on which the invention is based, said limitation is due to the fact that as the junction between the collector $c_I$ and the base $b_I$ is operated in its blocking direction, a considerable capacity C is operative across it, through which reaction on the source 7 of input voltage were possible if an alternating voltage were to be produced at the collector $c_I$ of the first transistor I. This reaction, however, is made ineffective because the junction of the input circuit of the second transistor II, whose base $b_{II}$ is connected to a point of constant potential is operated in its pass-direction and consequently has a low input impedance, so that emitter $e_{II}$ of the transistor II also carries a substantially constant voltage.

With this method of connection the supply voltage available for each transistor—i.e. that part of the voltage of the source 8 which is active in the circuit between the emitter and the collector—is each time equal to the total voltage of the source 8.

In the circuit-arrangement shown in FIG. 2, the signal source 7 is again provided in the base circuit of the transistor I the connections of the negative terminal of the supply 8 to the electrodes $e_I$, $b_I$ and $c_{II}$ being the same. In this case, however, the collector $c_I$ is connected via the D.C. transmitting circuit 4 which, if desired, may comprise a frequency-dependent impedance, to the base $b_{II}$ of transistor II and its emitter $e_{II}$ is directly connected to the positive terminal of the supply 8.

This yields a higher voltage amplification per transistor and the part of the supply voltage available with respect to transistor II is again equal to the voltage of the source 8. Owing to the voltage loss of the order of only 0.1 v. between the electrodes $e_{II}$ and $b_{II}$ the part for the transistor I is approximately equal to the voltage of the supply 8.

In FIG. 3, the signal to be amplified is again supplied from the source 7 to the base $b_I$ of the first transistor I, an amplified signal being produced at the emitter $e_{II}$ of the last transistor II. The transistors I and II are again of opposite conductivity type, the transistor I preferably being of the npn-type and the transistor II being of the pnp-type, thus reducing the noise and increasing the output power.

The collector $c_I$ of the transistor I is again connected to the base $b_{II}$ of the transistor II via a D.C. transmitting circuit 4, a negative feedback impedance 16 being connected in the common circuit connecting the negative terminal of the supply 8 to the emitter $e_I$ of the first transistor I and to the collector $c_{II}$ of the last transistor II.

This method of connection again permits each transistor I and II to be supplied substantially with the full voltage of source 8. To this end the voltage dividers 17, 18 and 19, 20 respectively, which determine the biasses of the emitter $e_{II}$ of the transistor II and of the base $b_I$ of the transistor I respectively, are adjusted in such a manner that the first-mentioned electrode has a bias approximately corresponding to the voltage of the positive terminal, and the last-mentioned electrode has a bias approximately corresponding to the voltage of the negative terminal of source 8. With these biasses, the negative feed-back impedance 16, which will in most cases be a resistor but, of course, may alternatively be frequency-dependent, may simply be connected directly in the circuit common to the collector circuit of transistor II and to the emission circuit of transistor I.

The current through said negative feed-back impedance 16 is then found to be practically exactly equal to the emission current of transistor II, hence the negative feed-back yields a considerable reduction of distortion of said current and, moreover, stabilisation of the working point of the transistors. Consequently, if the output impedance 10 is connected in the emission circuit of transistor II, the signal produced across it will only be slightly distorted.

In order to prevent an excessive direct current to the base $b_{II}$, said base $b_{II}$ may, if need be, be connected to the emitter $e_{II}$ through an impedance which is small with respect to direct current and large with respect to alternating current, for example an inductance in series with a very small resistor.

Figure 4:
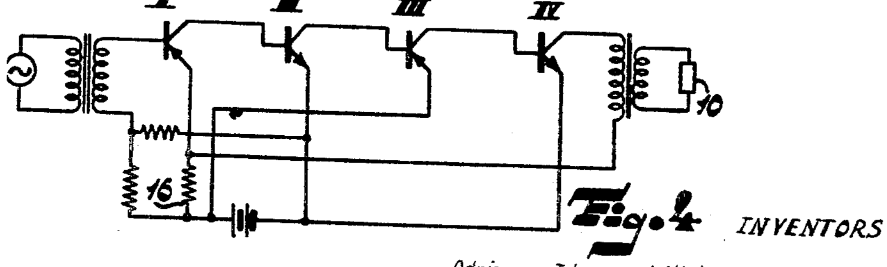
FIG. 4 shows a variant of FIG. 3, in which the cascade comprises four transistors.

FIG. 4 shows a similar amplifier comprising a cascade of four transistors I, II, III, IV. The negative feed-back impedance 16 is again provided in the circuit common to the emission circuit of the first transistor I and the collector circuit of the last transistor IV of the cascade. However, the current through the negative feed-back impedance 16 is now practically exactly equal to the collector current of the last transistor IV of the cascade and therefore the output impedance 10 is provided in the collector circuit of said transistor IV in order that the distortion of the amplified signal may remain small.

What is claimed is:

A transistor amplifier comprising a first transistor having first base, first emitter, and first collector electrodes, a second transistor having second base, second emitter, and second collector electrodes, said first and second transistors being of opposite conductivity type, a single source of energy supply having first and second terminals, a source of input signals, a resistive voltage divider connected in parallel with said source of supply and having a first tap toward said first terminal and a second tap toward said second terminal, first direct current conductive means connecting said first terminal to said first emitter, second direct current conductive means including an output impedance connected between said first terminal and said second collector, third direct current conductive means connecting said first collector to said second emitter, a fourth direct current conductive means connected between said second tap and said second base to provide a substantially constant voltage at said second base, fifth direct current conductive means connecting said first tap to said first base to supply a substantially constant voltage to said first base and to provide a direct current path from said first base to said first emitter, means connecting said source of signals in series with said path, and direct current conductive impedance means connecting said first collector to said second terminal, said first base and second collector being free of any direct connection therebetween, whereby said amplifier produces at said output impedance an amplification of said input signals.

References Cited in the file of this patent

UNITED STATES PATENTS

| | | |
|---|---|---|
| 2,655,609 | Shockley | Oct. 13, 1953 |
| 2,666,817 | Raisbeck et al. | Jan. 19, 1954 |
| 2,666,818 | Shockley | Jan. 19, 1954 |
| 2,666,819 | Raisbeck | Jan. 19, 1954 |
| 2,730,576 | Caruthers | Jan. 10, 1956 |
| 2,794,076 | Shea | May 28, 1957 |

FOREIGN PATENTS

| | | |
|---|---|---|
| 665,867 | Great Britain | Jan. 30, 1952 |